United States Patent

[11] 3,610,926

[72] Inventors Jacob Kastner
Downers Grove;
Billie G. Oltman, Worth, both of Ill.
[21] Appl. No. 856,278
[22] Filed Sept. 9, 1969
[45] Patented Oct. 5, 1971
[73] Assignee The United States of America as represented by the United States Atomic Energy Commission

[54] DOSIMETER FORMED OF A RADIATION SENSITIVE THERMOLUMINESCENT MATERIAL AND METHOD OF READING THE SAME
6 Claims, 5 Drawing Figs.

[52] U.S. Cl. ................................... 250/71, 250/71.5
[51] Int. Cl. ................................... G01n 23/00
[50] Field of Search ................................... 250/71 R, 71.5 R

[56] References Cited
UNITED STATES PATENTS

| | | | |
|---|---|---|---|
| 2,616,051 | 10/1952 | Daniels.......................... | 250/71 |
| 3,388,252 | 6/1968 | Medlin.......................... | 250/71 |
| 3,412,248 | 11/1968 | Kastner et al................. | 250/71 |
| 3,419,720 | 12/1968 | Debye et al................... | 250/71 |
| 3,458,700 | 7/1969 | Kohashi........................ | 250/71 |

OTHER REFERENCES
Thermoluminescence-Theory & Applications by Lancaster-Electronics World, Mar. 1969, pp. 43– 46.

*Primary Examiner*—James W. Lawrence
*Assistant Examiner*—P. C. Nelms
*Attorney*—Roland A. Anderson ABSTRACT: A dosimeter incorporates a crystalline thermoluminescent structure to store radiant energy. The crystalline thermoluminescent material can be a combination of different materials or a single material. The dosimeter is read out by applying energy to the crystal to cause mechanical vibration or crystal lattice vibration at the natural resonant frequency of the crystal. The energy applied may be an alternating current or coherent light energy as desired.

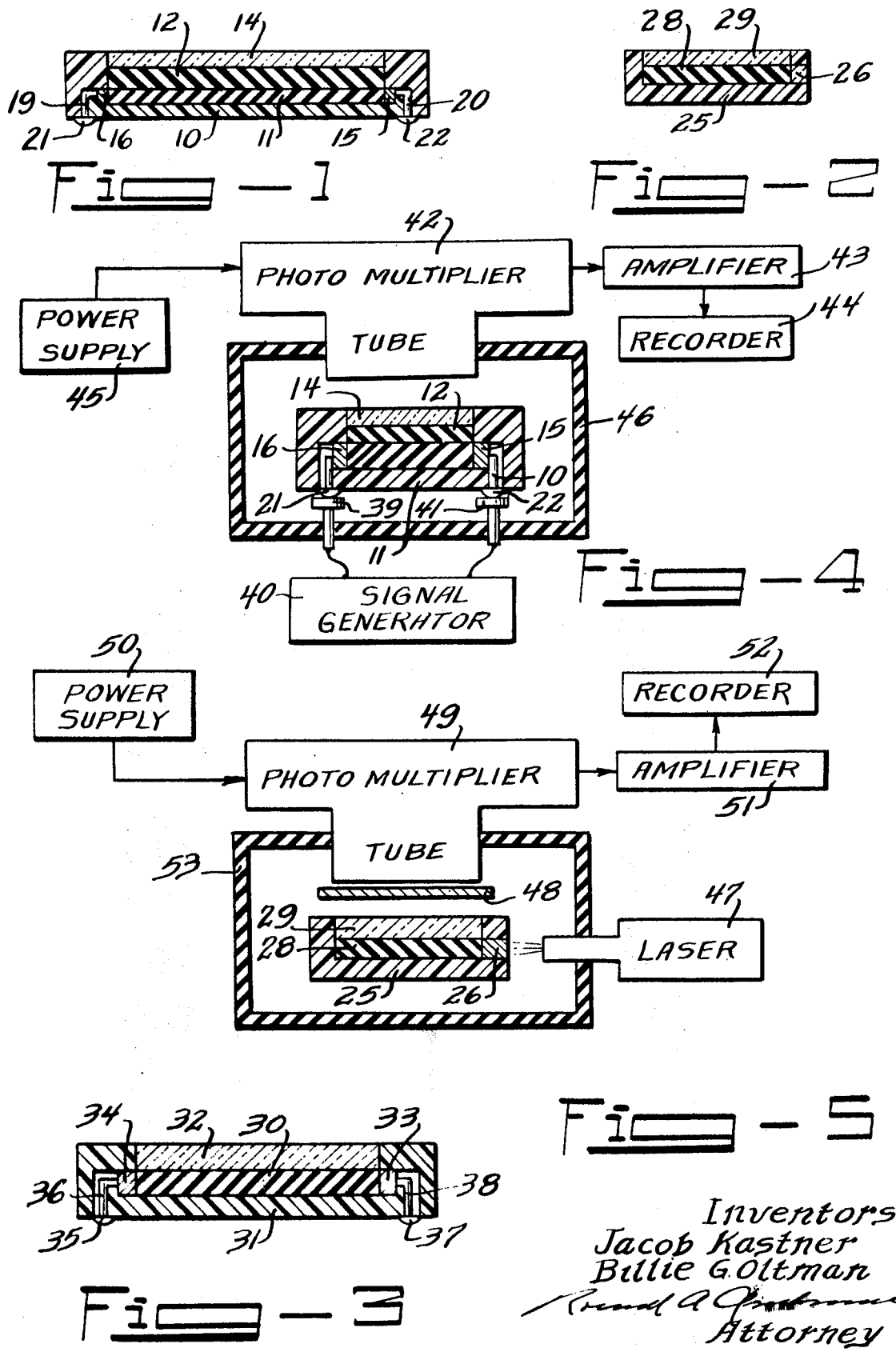

3,610,926

DOSIMETER FORMED OF A RADIATION SENSITIVE THERMOLUMINESCENT MATERIAL AND METHOD OF READING THE SAME

CONTRACTUAL ORIGIN OF THE INVENTION

The invention described herein was made in the course of, or under, a contract with the United States Atomic Energy Commission.

BACKGROUND OF THE INVENTION

A standard technique for radiation dosimetry involves the thermal stimulation of luminescence by applying heat energy to an irradiated thermoluminescent material directly from a heat source. It is desirable to improve this technique in order to measure the stored energy in the thermoluminescent material more easily. It is also useful to have a thermoluminescent dosimeter which can be read without heating. Preferably the dosimeter could be constructed in the form of a badge or medallion which could be positioned as desired.

It is therefore an object of this invention to provide an improved thermoluminescent dosimeter.

Another object of this invention is to provide a thermoluminescent dosimeter which can be read without the direct application of thermal energy.

Another object of this invention is to provide a thermoluminescent dosimeter which can be read without heating the thermoluminescent material.

SUMMARY OF THE INVENTION

In practicing this invention a dosimeter is provided in which the energy storage material is a radiation-sensitive crystalline thermoluminescent material. The radiation-sensitive material can consist of a plate of piezoelectric material with the radiation-sensitive material disposed thereon, a plate of piezoelectric material, such as quartz, which is also thermoluminescent, or a plate of radiation-sensitive thermoluminescent crystalline material such as CaF or LiF.

After irradiation of the radiation-sensitive material it can be read by supplying sufficient energy at the electron trap sites to allow the stored energy to be released as luminescence. In prior art devices this energy was supplied by directly heating the radiation-sensitive material. In the structure of this invention the energy is supplied by indirectly heating the radiation-sensitive material or, in particular cases, supplying energy directly to the crystal lattice to cause the lattice to vibrate at its natural resonant frequency.

In one embodiment of the invention, using a piezoelectric plate, readout is accomplished by the application of energy to the piezoelectric plate so that the plate vibrates mechanically. The mechanical vibration of the piezoelectric crystal develops heat which causes the stored energy to be released from the radiation-sensitive material. This method is applicable to either the structure where the piezoelectric material is also thermoluminescent or where the thermoluminescent material is separate from the piezoelectric material.

In the structure where a crystalline thermoluminescent material is used, stored energy release can be obtained without heating if the frequency of the applied energy is sufficiently high to cause lattice vibration at the natural crystal frequency. One method of accomplishing this is to supply coherent light energy from a laser to the crystal. For example, light energy from a ruby laser at a wavelength of approximately 6,900 angstroms will cause lattice vibration of a quartz crystal at its natural resonant frequency, of the order of $10^{13}$ c.p.s., due to the well-known Raman effect. In the Raman effect a small portion of the energy in the laser beam acts to cause lattice vibration of the thermoluminescent crystal. The resulting lattice vibration will cause the stored energy to be released as light.

When the dosimeter is read by means of a laser beam the thermoluminescent material does not need to be piezoelectric as the laser beam will cause crystal lattice vibration of the crystalline material even if symmetrical. Thus a thermoluminescent material, such as CaF or LiF, can be used. The crystalline material, however, must be transparent to the radiation from the laser beam. By transparent it is meant that the energy extracted from the laser beam and resulting in crystal heating must be appreciably less than the energy extracted from the laser beam and resulting in crystal lattice vibration.

BRIEF DESCRIPTION OF THE DRAWINGS

The invention is illustrated in the drawings of which:

FIG. 1 is a cross section of the dosimeter of this invention; dosimeter;

FIG. 2 is a cross section of a second embodiment of the dosimeter;

FIG. 3 is a cross section of a third embodiment of the dosimeter;

FIG. 4 illustrates the method by which the energy stored in the dosimeter of FIGS. 1 and 3 is read out; and FIG. 5 illustrates the method by which the energy stored in the dosimeter of FIG. 2 is read out.

DETAILED DESCRIPTION OF THE INVENTION

In FIG. 1 there is shown a dosimeter in the form of a badge or medallion incorporating the features of this invention. The dosimeter comprises an enclosure 10 which contains a piezoelectric crystal 11 mounted therein. The piezoelectric crystal 11 has electrodes 15 and 16 mounted on opposite faces thereof. Wire 19 extends from electrode 16 to contact 21 and wire 20 extends from electrode 15 to contact 22.

Disposed over the face of piezoelectric crystal 11 is a thermoluminescent material 12 which may be, for example, LiF or CaF. A transparent plastic window 14 acts to seal the badge and is used for readout of the stored energy.

FIn FIG. 2 there is shown another form of the badge which incorporates a single layer of thermoluminescent material. The enclosure 25 supports the thermoluminescent material 28. The thermoluminescent material may be a single layer of piezoelectric material which is also thermoluminescent, such as quartz, or it may be a thermoluminescent material such as CaF or LiF. First and second transparent windows 26 and 29 act to seal the badge and provide means for reading out the stored energy in a manner to be subsequently described.

In FIG. 3 there is shown the dosimeter structure of FIG. 2 with electrodes shown in the dosimeter of FIG. 1. An enclosure 31 contains a piezoelectric crystal 30 which is also thermoluminescent. A transparent window 32 acts to seal the badge. Electrodes 33 and 34 are positioned on opposite ends of piezoelectric crystal 30 for applying electric energy to the crystal. Electrode 33 is connected to terminal 37 by wire 38 and electrode 34 is connected to terminal 35 by wire 36.

In FIG. 4 there is shown the method by which the energy stored in the dosimeter as a result of irradiation is measured. After irradiation, dosimeter 10 of FIG. 1 is placed in a lighttight enclosure 46. Contacts 21 and 22 are connected to contacts 39 and 41 respectively. Contacts 39 and 41 are connected to signal generator 40 which supplies an electric current of a desired frequency to the electrodes 15 and 16 of dosimeter 10, causing mechanical vibration of the piezoelectric crystal 11. The mechanical vibration of crystal 11 develops sufficient heat to apply enough energy to the electron trap sites of the thermoluminescent material 12 to release the energy stored therein as luminescence.

While the dosimeter of FIG. 1 is shown in the readout structure of FIG. 4, the dosimeter structure of FIG. 3 could also be used. Dosimeter 31 would be placed in the lighttight enclosure 46 with contacts 35 and 37 connected to contacts 39 and 41 respectively. Crystal 30 would be mechanically vibrated by the signal applied to electrodes 33 and 34 to release the energy stored in the piezoelectric thermoluminescent crystal as luminescence.

In FIG. 5 there is shown the method of reading the dosimeter of FIG. 2. Dosimeter 25 is placed in lighttight enclosure 53 for readout. Energy is supplied to the thermoluminescent crystal 28 by means of a beam of light from laser 47. Laser 47 may be, for example, a ruby laser emitting coherent light at a wavelength of 6,900 angstroms. The light from laser 47 passes through the transparent window 26 in dosimeter 25 and supplies energy to crystal 28 so that the crystal lattice vibrates at its natural resonant frequency. This reaction of crystal 28 to the laser beam is the well-known Raman effect.

The vibration of the lattice of crystal 28 supplies enough energy at the electron trap sites to allow the stored energy to be released as luminescence as previously described. The luminescence is detected by photomultiplier 49 and the resulting signal is amplified in amplifier 51 and recorded in recorder 52.

It will be understood that the invention is not to be limited to the details given herein but that it may be modified within the scope of the appended claims.

The embodiments of the invention in which an exclusive property or privilege is claimed are defined as follows:

1. A radiation dosimeter including in combination, a radiation-sensitive piezoelectric thermoluminescent plate having a first portion formed of a piezoelectric material and a second portion formed of a radiation-sensitive thermoluminescent material disposed over said piezoelectric material, means attached to said piezoelectric material for supporting said plate whereby said thermoluminescent material receives radiation and means for indicating the radiation dosage.

2. The radiation dosimeter of claim 1 wherein, said radiation-sensitive thermoluminescent material is LiF.

3. The radiation dosimeter of claim 1 wherein, said radiation-sensitive thermoluminescent material is CaF.

4. A method of measuring radiation including the steps of:
   a. exposing a radiation-sensitive piezoelectric thermoluminescent crystal material to the radiation to store energy therein,
   b. exciting said material electrically to cause mechanical vibration thereof to release said stored energy as a light output, and
   c. measuring the intensity of said light output.

5. The method of measuring radiation of claim 4, wherein, said radiation-sensitive piezoelectric thermoluminescent material includes a first portion formed of a piezoelectric material and a second portion formed of a radiation-sensitive thermoluminescent material, said first portion being excited electrically to cause mechanical vibration thereof, said mechanical vibration of said first portion causing mechanical vibration of said second portion to release as a light output said energy stored in said second portion.

6. A method of measuring radiation including the steps of:
   a. exposing a radiation-sensitive thermoluminescent crystal material to the radiation to store energy therein,
   b. irradiating said material with a coherent light beam to cause the crystal lattice of said crystal material to vibrate at its natural resonant frequency to thereby release said stored energy as a light output, and
   c. measuring the intensity of said light output.